(12) United States Patent
Haller et al.

(10) Patent No.: US 7,996,730 B2
(45) Date of Patent: Aug. 9, 2011

(54) CUSTOMIZABLE SYSTEM FOR THE AUTOMATIC GATHERING OF SOFTWARE SERVICE INFORMATION

(75) Inventors: Daniel Michael Haller, Las Vegas, NV (US); Joel Frank Farber, San Jose, CA (US); Brian S. Dreher, San Jose, CA (US); Jeffrey Ralph Ruggles, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 11/446,426

(22) Filed: Jun. 5, 2006

(65) Prior Publication Data

US 2007/0294593 A1 Dec. 20, 2007

(51) Int. Cl.
*G06F 11/00* (2006.01)
(52) U.S. Cl. ............................. 714/48; 714/49
(58) Field of Classification Search ............ 714/49
See application file for complete search history.

(56) References Cited

U.S. PATENT DOCUMENTS

| | | | | |
|---|---|---|---|---|
| 6,427,144 | B1* | 7/2002 | Murray | 707/3 |
| 6,517,587 | B2 | 2/2003 | Satyavolu et al. | |
| 6,988,074 | B2 | 1/2006 | Koritzinsky et al. | |
| 7,111,206 | B1* | 9/2006 | Shafer et al. | 714/48 |
| 7,225,245 | B2* | 5/2007 | Gurumoorthy et al. | 709/223 |
| 7,231,549 | B1* | 6/2007 | Rhea et al. | 714/25 |
| 2003/0097469 | A1 | 5/2003 | Blair et al. | |
| 2003/0115018 | A1* | 6/2003 | Sharma et al. | 702/183 |
| 2003/0135592 | A1 | 7/2003 | Vetter et al. | |
| 2003/0158920 | A1 | 8/2003 | Lynch et al. | |
| 2004/0088140 | A1* | 5/2004 | O'Konski et al. | 702/183 |
| 2004/0123188 | A1* | 6/2004 | Srinivasan et al. | 714/44 |
| 2004/0128400 | A1 | 7/2004 | Srinivasan et al. | |
| 2004/0205398 | A1* | 10/2004 | Osborn et al. | 714/25 |
| 2004/0249914 | A1 | 12/2004 | Flocken et al. | |
| 2005/0027727 | A1* | 2/2005 | Garcea et al. | 707/100 |
| 2005/0125719 | A1* | 6/2005 | Daniel et al. | 715/513 |
| 2006/0005066 | A1* | 1/2006 | Brauneis et al. | 714/4 |
| 2006/0031446 | A1 | 2/2006 | Hamedi | |
| 2006/0048025 | A1 | 3/2006 | Filipovic | |

OTHER PUBLICATIONS

Oracle Diagnostics Pack, Oracle Data Sheet, Oracle, Jan. 2004, pp. 1-5.

* cited by examiner

*Primary Examiner* — Joshua A Lohn
(74) *Attorney, Agent, or Firm* — Sughrue Mion, PLLC

(57) ABSTRACT

The present invention provides methods and systems for a customizable collector application, which automates multiple diagnostic techniques to obtain sets of diagnostic information. The collector application is easily customizable for use by different products, and may reduce the diagnostic information gathering to a single session. This includes gathering all of the required sets of information about a product problem, the hardware environment, the maintenance levels of the operating system environment, and the involved middleware, both local and distributed. In addition, the collector application has a reusable framework designed to have minor external customization for each product that requires its' service. The output of the collector application may be provided in a format, such as XML, that is viewable by another application, such as browser.

36 Claims, 3 Drawing Sheets

US 7,996,730 B2

CUSTOMIZABLE SYSTEM FOR THE AUTOMATIC GATHERING OF SOFTWARE SERVICE INFORMATION

FIELD

The present invention relates to gathering diagnostic information. In particular, the present invention relates to methods and systems for gathering diagnostic information in a customizable manner for each supported application.

BACKGROUND

Computer systems are constantly growing more complex to the point that it is extremely difficult to diagnose these systems. Software now presents a wide variety of configuration options, programming interfaces (APIs), software dependencies, performance tuning, etc. Typically, these complex computer systems comprise several layers of architectural abstractions. Each layer may have a number of components that interact with each other in a virtually infinite number of ways. Thus, this complexity makes diagnosis of the system very difficult.

Gathering sufficient diagnostic data on a complex stack of software can be both labor-intensive and error-prone. It is usually an iterative multi-pass process conducted between a remote service representative and the user experiencing the problem. These problems are exacerbated if the computer system topology is distributed or client-server.

Frequently, the diagnostic process requests data that is not available to the user as it pertains to hardware and software in "the stack": the operating system, middleware (including database and communication software), a specific application or user interface, with which the user is not familiar. Often, the service representative knows and uses diagnostic techniques. These techniques, however, are generally beyond the technical depth of the end user.

Getting the necessary diagnostic information requires educating the end-user about information gathering. Because many users are unable to figure out what has gone wrong with their system, the user is often hostile or unable to gather as much information as is needed to efficiently isolate the problem. This information gathering dialog can thus be tedious, expensive, frustrating, and time consuming.

Due to this multi-step manual process and frequent user hostility, the service representative is often disinclined to acquire all of the potentially needed facts in the initial dialog. Collecting full information involves walking the end user through complex diagnosis on a number of related interdependent components in the stack. Because each diagnostic test is an imposition on the end user, the service representative tries to run the fewest possible tests. Consequently, too little information is often obtained in the initial call, resulting in a back and forth dialog between service representative and end user, which again exacerbates the frustration of the user. Each iteration of this dialog can eventually contribute to the complete diagnosis; yet all the while the system is inoperable or operating poorly.

Accordingly, it may be desirable to provide methods and systems that can automatically and efficiently gather diagnostic information from a computer system. In addition, it may be desirable to provide methods and systems that can gather diagnostic information in a manner that is easy and transparent for the user.

SUMMARY

In accordance with one feature of the invention, a method is provided for gathering diagnostic information in a customized manner for a target running on a computer. A specification file is received and the specification file identifies sets of diagnostic information requested by the target to be collected from the computer. The sets of diagnostic information are then collected based on the specification file. The sets of diagnostic information may then be provided in a format that is specified in the specification file.

In accordance with another feature of the invention, a computer is configured to gather sets of diagnostic information for a target that is running on the computer. The computer generally comprises a memory and a processor. The memory comprises a specification file that identifies sets of diagnostic information requested by the target to be collected from the computer. The specification file also customizes a collector application for the target. The processor runs the collector application, which reads the specification file, collects the sets of diagnostic information requested by the target, and formats the diagnostic information into an output based on the specification file.

In accordance with another feature of the invention, a diagnostic system can be customized for a target running on a first computer. The system generally comprises a collector application and a viewer application. The collector application runs on the first computer and is customized by an external specification file specifying sets of diagnostic information requested by the target. The collector application collects the sets of diagnostic information requested by the target and formats the diagnostic information into an output based on the specification file. The viewer application receives the diagnostic information output from the collector application and provides a view of the diagnostic information.

Additional features of the invention will be set forth in part in the description which follows, and in part will be obvious from the description, or may be learned by practice of the invention. The features of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

The present invention provides methods and systems provide a customizable collector application, which automates multiple sets of diagnostic techniques. The customizable collector application has a reusable framework that permits customization as part of its service. This application is customizable for use by different products and can reduce the diagnostic information gathering to a single session (or relatively few sessions). When a computer system is experiencing a problem, such as an error or poor performance, a collector application may be invoked to collect sets of diagnostic information. The collector application may be customized using a specification file that is external to the collector application. The specification file may be specifically configured to diagnose problems with a product or component (herein referred to as the "target" of the collector application) running on the computer system.

The diagnostic information gathering by the collector application may include, for example, gathering all of the required information about a problem, the hardware environment, the maintenance levels of the operating system environment, and the involved middleware, both local and distributed. The collector application may then output the diagnostic information in a readily portable form, such as an extensible markup language (XML) file. The format of the XML file may be specified in the specification file. A user or technician may then view the diagnostic information using a standard browser, either remotely or locally on the system being diagnosed.

One skilled in the art will recognize that the customizable collector software may eliminate the need for an iterative human dialog and the manual gathering, packaging and transportation of diagnostic information. In addition, the collector software can eliminate the common human errors in executing diagnostic information gathering techniques and errors in transcription. Further, the collector software can be customized to diagnose not only deterministic (or predictable) issues, but non-deterministic issues as well, since substantially complete diagnostic information can be collected in one invocation of the collector software. Regardless of how many individual detailed diagnostics are required, the end user can invoke the collector software by executing a single command. This can facilitate far faster, less expensive resolution of the user problem, and restoration of the business function. Of course, one skilled in the art will recognize that embodiments of the present invention may provide a number of benefits and advantages over the prior art.

Reference will now be made in detail to exemplary embodiments of the invention, which are illustrated in the accompanying drawings. Wherever possible, the same reference numbers will be used throughout the drawings to refer to the same or like parts. The present disclosure now begins with reference to FIG. 1.

Figure 1:
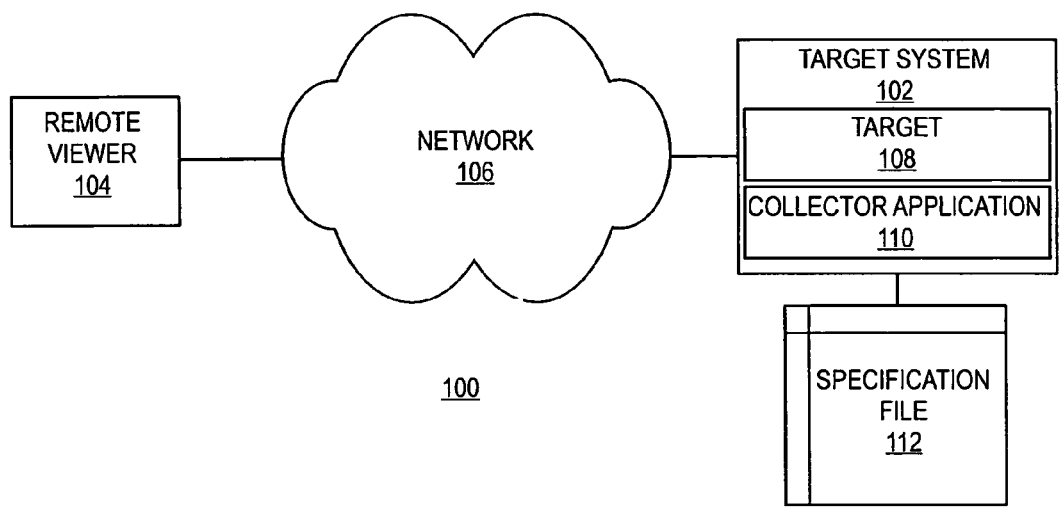
FIG. 1 shows a system that is consistent with the principles of the present invention.

FIG. 1 shows a system 100 that is consistent with the principles of the present invention. For purposes of illustration, system 100 illustrates an exemplary remote support environment. In such an environment, a user generally contacts a support center for assistance. The support center may then assist the user in running diagnostic techniques on their target computer or system and provide that information over a network. The diagnostic information may be provided in the form of an email, a file download, etc.

Accordingly, system 100 is shown comprising a target system 102 of concern by the user, and a remote viewer 104, which are coupled together via a network 106. Network 106 may comprise a local area network, or wide area network, or a combination of networks. In addition, the components of system 100 may communicate with each other using known protocols, such as the transport control protocol and internet protocol ("TCP/IP") and hypertext transport protocol ("HTTP").

The components of system 100 may be implemented on separate devices or may be implemented on one or more of the same devices or systems. For example, as noted above, target system 102 and viewer 104 may be implemented on separate systems. However, target system 102 and viewer 104 may run on the same machine and run under a common operating system. Such implementations may be useful, for example, when the user is interested in self diagnosing their own systems. Alternatively, system 100 may have one or more of its components implemented on multiple machines that run different operating systems. The components of system 100 shown in FIG. 1 will now be described in turn.

Target system 102 may refer to any device or plurality of devices. For example, target system 102 may simply be a personal computer, workstation, or terminal. Alternatively, target system 102 may be a server, a database server, an application server, and the like. Such devices and systems are well known to those skilled in the art.

Although FIG. 1 shows a single target system 102, system 100 may include any number of target systems. As also shown, target system 102 may further comprise a target 108, a collector application 110, and a specification file 112. These components will now be briefly described.

Target 108 generally refers to any software or component of software that runs on target system 102. Target 108 may be on many types of computer system environments and many types of computer systems. For example, target 108 may be an application running on a UNIX-based operating system, or a database application, such as the DB2 Universal Database system from IBM Corporation.

Collector application 110 refers to an application or piece of software that collects diagnostic information regarding target 108. Collector application 110 is a customizable piece of software, which automates multiple sets of diagnostic techniques. In some embodiments, collector application 110 is configured to reduce diagnostic information gathering to a single session (or relatively few sessions) and gather all of the required information about a product problem with target 108.

In general, diagnostic information refers to information that identifies the cause or nature of a problem with target 108. The problem may range from an execution failure to poor performance. For example, the diagnostic information may include information that indicates the hardware environment of target system 102, the maintenance levels of the operating system environment, and the involved middleware both local to target system 102 and distributed. One skilled in the art will also recognize that collector application 110 may collect sets of diagnostic information for any number of targets simultaneously. For example, collector application 110 may be requested to gather diagnostic information for a plurality of targets that interact with each other.

Collector application 110 may be customizable and utilize an extensible framework for use by any number of products that have a target, such as target 108, running on target system 102. That is, collector application 110 may run as a service on target system 102 that runs and configures itself accordingly to the needs of the target being diagnosed. In some embodiments, collector application 110 uses a reusable framework designed to allow its customization for each product that requires its' service using an external specification file 112. For example, collector application 110 may be initiated via a command prompt for a ".bat" file execution (i.e., for Java implementations) or ".sh" file execution (i.e., for UNIX implementations), etc. An example for collector application 110 written in Java is provided below.

```
public class Sample {
    public static void main(String[ ] args) {
        if (args.length != 6) {
            System.out.println("Input error: Correct useage is 'java com.ibm.dbtools.asg.Sample " + " <instance> <hostname> <port>
```

-continued

```
<database> <username> <password>'");
    System.exit(0);
}
//Req'd arguments for the instance
String instance = args[0];
String hostname = args[1];
String port = args[2];
String database = args[3];
String user = args[4];
String pass = args[5];
//Create the instance
AutomatedServiceGatherer asg =
new AutomatedServiceGatherer(instance, hostname, port, database, user, pass);
    //Collect diagnostic information
    asg.runQuery("SELECT COUNT(*) FROM SYSIBM.SYSTABLES");
    asg.runQuery("SELECT CREATOR,NAME FROM SYSIBM.SYSTABLES FETCH FIRST 100 ROWS ONLY");
    asg.runDB2Command("list active databases");
    asg.runDASCommand("db2licm −1 \n");
    asg.runCommandPromptCommand("dir");
    asg.grabFileContents("sample.log");
    asg.addDiagnosticInfo("SampleInfo1","This is the sample text to add");
    //Write the service XML file
    asg.flush("service.xml");
    //Display finishing text to the user
    System.out.println("*********Sample Tool Automated Service Gatherer Finished *********");
    System.out.println("********File : service.xml generated **********");
    //exit
    System.exit(0);
  }
}
```

Specification file 112 provides a list that identifies the diagnostic information requested for target 108 and may indicate services needed to diagnose target 108. For example, target 108, or a consumer (such as a user at target system 102, or a technician) that wishes to employ the services of collector application 110 may provide specification file 112.

Specification file 112 may be provided in a variety of well known ways, such as a download from a website on network 106, an email, a file transfer operation, and the like. For example, specification file 112 may be maintained at a central location that is accessible via network 106, but which is available for download to target system 102. Alternatively, specification file 112 may be included with target 108 during its installation. Of course, one skilled in the art will recognize that there are a wide variety of ways to generate and distribute specification file 112.

In some embodiments, specification file 112 may comprise a set of standard sections for the hardware environment, operating system, the middleware environment, and product specific areas for target 108 to collect. Specification file 112 may also supports the specification of various operating systems, file systems, and middleware commands to execute. Additionally, specification file 112 may include custom diagnostic code that augments the information collected by collector application 110, including additional materials that target 108 can specify to facilitate adequate coverage of the diagnostic information. Furthermore, specification file 112 may include code that is subject to a conditional, which if satisfied, results in an output and the cumulative results comprise the diagnostic information sought. For example, this feature can be employed by other processes or devices to query another system and have the response formatted in the way that specification 112 has specified.

In addition, specification file 112 may indicate the packaging and manner of transportation of the diagnostic information. For example, in some embodiments, specification file 112 may specify XML as the standard format for the output packaging by collector application 110. The output may then be output to, for example, viewer 104, via email, file transfer protocol, etc. For example, below is an example of an XML formatted output that may be produced by collector application 110.

```
<?xml version="1.0" encoding="UTF-8" ?>
- <AutomatedServiceGatherer>
    <SystemProperties input="Java">Local System Time : Fri Oct 14 11:27:00 PDT 2005 Total
Available Memory : 1573800 bytes awt.toolkit = sun.awt.windows.WToolkit file.encoding =
Cp1252 file.encoding.pkg = sun.io file.separator = \ java.awt.graphicsenv =
sun.awt.Win32GraphicsEnvironment java.awt.printerjob = sun.awt.windows.WPrinterJob
java.class.path = ASG.jar;xercesImpl.jar;xml-apis.jar;
c:\progra~1\IBM\SQLLIB\java\Common.jar;c:\progra~1\ibm\sqllib\tools\db2das.jar;ASG.jar;xercesImpl.jar;xml-apis.jar;
c:\progra~1\IBM\SQLLIB\java\Common.jar;c:\progra~1\ibm\sqllib\tools\db2das.jar;ASG.jar;xercesImpl.jar;xml-apis.jar;
c:\progra~1\IBM\SQLLIB\java\Common.jar;c:\progra~1\ibm\sqllib\tools\db2das.jar;.;
C:\PROGRA~1\IBM\SQLLIB\java\db2jcc.jar;C:\PROGRA~1\IBM\SQLLIB\java\sqlj.zip;
C:\PROGRA~1\IBM\SQLLIB\bin;C:\PROGRA~1\IBM\SQLLIB\java\common.jar;C:\PROGRA~1\IBM\SQLLIB\java\db2jcc_license_cisuz.jar;
C:\PROGRA~1\IBM\SQLLIB\java\db2jcc_license_cu.jar;
c:\progra~1\IBM\SQLLIB\FUNCTION;c:\progra~1\IBM\SQLLIB\FUNCTION\AHXJAR.jar;
c:\eclipse\workspace\DAECode;c:\progra~1\IBM\SQLLIB\FUNCTION\test.jar;
C:\PROGRA~1\IBM\SQLLIB\java\db2java.zip;C:\ProgramFiles\IBM\SQLLIB\java\db2jcc_license_cisuz.jar
java.class.version = 48.0 java.endorsed.dirs =
C:\j2sdk1.4.2_04\jre\lib\endorsed java.ext.dirs =
C:\j2sdk1.4.2_04\jre\lib\ext java.home = C:\j2sdk1.4.2_04\jre java.io.tmpdir =
C:\DOCUME~1\ADMINI~1\LOCALS~1\Temp\ java.library.path =
C:\j2sdk1.4.2_04\bin;.;C:\WINDOWS\System32;C:\WINDOWS;C:\j2sdk1.4.2_04\bin;C:\PROGRAM FILES\THINKPAD\UTILITIES;
C:\WINDOWS\system32;C:\WINDOWS;C:\WINDOWS\System32\Wbem;
C:\Program Files\IBM\Infoprint Select;C:\Utilities;C:\Notes;C:\Program Files\IBM\Trace Facility\;
C:\Program Files\IBM\Personal Communications\;C:\WINDOWS\Downloaded Program Files;
C:\PROGRA~1\IBM\SQLLIB\BIN;C:\PROGRA~1\IBM\SQLLIB\FUNCTION;C:\Program Files\Microsoft Visual Studio .NET 2003\Vc7\bin;
C:\Program Files\Microsoft Visual Studio .NET 2003\Common7\IDE;
C:\PROGRA~1\IBM\SQLLIB\SAMPLES\REPL;C:\Program Files\IBM\SQLLIB\lib;c:\program files\ibm\sqllib\bin;
c:\cygwin\bin;C:\CMVC\exe;C:\CMVC\exe\bin;C:\Program Files\IBM\CMVCDC50;
C:\Program Files\IBM\CMVCDC40;C:\Infoprint;
java.runtime.name = Java(TM) 2 Runtime Environment, Standard Edition
java.runtime.version = 1.4.2_04-b05 java.specification.name = Java Platform API
Specification java.specification.vendor = Sun Microsystems Inc. java.specification.version =
1.4 java.util.prefs.PreferencesFactory = java.util.prefs.WindowsPreferencesFactory
```

-continued java.vendor = Sun Microsystems Inc. java.vendor.url = http://java.sun.com/
java.vendor.url.bug = http://java.sun.com/cgi-bin/bugreport.cgi java.version = 1.4.2_04
java.vm.info = mixed mode java.vm.name = Java HotSpot(TM) Client VM
java.vm.specification.name = Java Virtual Machine Specification
java.vm.specification.vendor = Sun Microsystems Inc. java.vm.specification.version = 1.0
java.vm.vendor = Sun Microsystems Inc. java.vm.version = 1.4.2_04-b05 line.separator =
os.arch = x86 os.name = Windows XP os.version = 5.1 path.separator = ;
sun.arch.data.model = 32 sun.boot.class.path =
C:\j2sdk1.4.2_04\jre\lib\rt.jar;C:\j2sdk1.4.2_04\jre\lib\i18n.jar;C:\j2sdk1.4.2_04\jre\lib\sun rsasign.jar;
C:\j2sdk1.4.2_04\jre\lib\jsse.jar;C:\j2sdk1.4.2_04\jre\lib\jce.jar;C:\j2sdk1.4.2_04\jre\lib\charsets.jar;
C:\j2sdk1.4.2_04\jre\classes sun.boot.library.path =
C:\j2sdk1.4.2_04\jre\bin sun.cpu.endian = little sun.cpu.isalist = pentium i486 i386 sun.io.unicode.encoding = UnicodeLittle sun.java2d.fontpath =
sun.os.patch.level = Service Pack 1 user.country = US user.dir =
C:\ASG user.home = C:\Documents and Settings\Administrator user.language = en user.name = haller user.timezone =
America/Los_Angeles user.variant = </SystemProperties>
  <runQuery input="SELECT COUNT(*) FROM SYSIBM.SYSTABLES">Row: 1:
1613</runQuery>
  <runQuery input="SELECT CREATOR,NAME FROM SYSIBM.SYSTABLES FETCH
FIRST 100 ROWS ONLY">Row: 1: ADDSVR , AHXCOLSOURCES Row: 2: ADDSVR ,
AHXCOLTARGETS Row: 3: ADDSVR , AHXCONNECTKEYS Row: 4: ADDSVR ,
AHXCONNKEYFILTERS Row: 5: ADDSVR , AHXDATASETMAPS Row: 6: ADDSVR ,
AHXDSLOADS Row: 7: ADDSVR , AHXDSTARGETS Row: 8: ADDSVR ,
AHXERRTABLE Row: 9: ADDSVR , AHXEVENTLOG Row: 10: ADDSVR ,
AHXFILEMAPS Row: 11: ADDSVR , AHXINDEXCOLS Row: 12: ADDSVR ,
AHXLOCATIONS Row: 13: ADDSVR , AHXSPECMAPS Row: 14: ADDSVR ,
AHXSPECS Row: 15: ADDSVR , AHXSQLSTMTS Row: 16: ADDSVR ,
AHXSQLTEXTS Row: 17: ADDSVR , AHXTABLEMAPS Row: 18: ADDSVR ,
AHXTBSOURCES Row: 19: ADDSVR , AHXTBTARGETS Row: 20: ADDSVR ,
AHXTEMPLATEMAPS Row: 21: ADDSVR , AHXTSTARGETS Row: 22: ADDSVR ,
AHXUSERPROPS Row: 23: ADDSVR , AHXVERSIONS Row: 24: ADDSVR ,
AHXWORKDATASETS Row: 25: ADDSVR , EMPLOYEE892 Row: 26: ADDSVR ,
MINUSCOL922 Row: 27: ADDSVR , PROJECT892 Row: 28: ADDSVR , SYSCOLUMNS
Row: 29: ADDSVR , SYSINDEXES Row: 30: ADDSVR , SYSKEYS Row: 31: ADDSVR ,
SYSRELS Row: 32: ADDSVR , SYSTABLES Row: 33: ADDSVR , SYSTABLESPACE
Row: 34: ADDSVR1 , AHXCOLSOURCES Row: 35: ADDSVR1 , AHXCOLTARGETS
Row: 36: ADDSVR1 , AHXCONNECTKEYS Row: 37: ADDSVR1 ,
AHXCONNKEYFILTERS Row: 38: ADDSVR1 , AHXDATASETMAPS Row: 39:
ADDSVR1 , AHXDSLOADS Row: 40: ADDSVR1 , AHXDSTARGETS Row: 41:
ADDSVR1 , AHXEVENTLOG Row: 42: ADDSVR1 , AHXFILEMAPS Row: 43:
ADDSVR1 , AHXINDEXCOLS Row: 44: ADDSVR1 , AHXLOCATIONS Row: 45:
ADDSVR1 , AHXSPECMAPS Row: 46: ADDSVR1 , AHXSPECS Row: 47: ADDSVR1 ,
AHXSQLSTMTS Row: 48: ADDSVR1 , AHXSQLTEXTS Row: 49: ADDSVR1 ,
AHXTABLEMAPS Row: 50: ADDSVR1 , AHXTBSOURCES Row: 51: ADDSVR1 ,
AHXTBTARGETS Row: 52: ADDSVR1 , AHXTEMPLATEMAPS Row: 53: ADDSVR1 ,
AHXTSTARGETS Row: 54: ADDSVR1 , AHXUSERPROPS Row: 55: ADDSVR1 ,
AHXVERSIONS Row: 56: ADDSVR1 , AHXWORKDATASETS Row: 57: ADDSVR1 ,
SYSCOLUMNS Row: 58: ADDSVR1 , SYSINDEXES Row: 59: ADDSVR1 , SYSKEYS
Row: 60: ADDSVR1 , SYSRELS Row: 61: ADDSVR1 , SYSTABLES Row: 62: ADDSVR1,
SYSTABLESPACE Row: 63: ADDSVRA , AHXCOLSOURCES Row: 64: ADDSVRA ,
AHXCOLTARGETS Row: 65: ADDSVRA , AHXCONNECTKEYS Row: 66: ADDSVRA ,
AHXCONNKEYFILTERS Row: 67: ADDSVRA , AHXDATASETMAPS Row: 68:
ADDSVRA , AHXDSLOADS Row: 69: ADDSVRA , AHXDSTARGETS Row: 70:
ADDSVRA , AHXEVENTLOG Row: 71: ADDSVRA , AHXFILEMAPS Row: 72:
ADDSVRA , AHXINDEXCOLS Row: 73: ADDSVRA , AHXLOCATIONS Row: 74:
ADDSVRA , AHXSPECMAPS Row: 75: ADDSVRA , AHXSPECS Row: 76: ADDSVRA ,
AHXSQLSTMTS Row: 77: ADDSVRA , AHXSQLTEXTS Row: 78: ADDSVRA ,
AHXTABLEMAPS Row: 79: ADDSVRA , AHXTBSOURCES Row: 80: ADDSVRA ,
AHXTBTARGETS Row: 81: ADDSVRA , AHXTEMPLATEMAPS Row: 82: ADDSVRA ,
AHXTSTARGETS Row: 83: ADDSVRA , AHXUSERPROPS Row: 84: ADDSVRA ,
AHXVERSIONS Row: 85: ADDSVRA , AHXWORKDATASETS Row: 86: ADDSVRA ,
SYSCOLUMNS Row: 87: ADDSVRA , SYSINDEXES Row: 88: ADDSVRA , SYSKEYS
Row: 89: ADDSVRA , SYSRELS Row: 90: ADDSVRA , SYSTABLES Row: 91:
ADDSVRA , SYSTABLESPACE Row: 92: ADDSVRB , AHXCOLSOURCES Row: 93:
ADDSVRB , AHXCOLTARGETS Row: 94: ADDSVRB , AHXCONNECTKEYS Row: 95:
ADDSVRB , AHXCONNKEYFILTERS Row: 96: ADDSVRB , AHXDATASETMAPS
Row: 97: ADDSVRB , AHXDSLOADS Row: 98: ADDSVRB , AHXDSTARGETS Row: 99:
ADDSVRB , AHXEVENTLOG Row: 100: ADDSVRB , AHXFILEMAPS</runQuery>
  <runDB2Command input="list active databases">list active databases Active Databases
Database name = FEDV8 Applications connected currently = 1 Database path =
C:\DB2\NODE0000\SQL00002\</runDB2Command>
  <runDASCommand input="db2licm −1">C:\Program Files\IBM\SQLLIB\DB2DAS00\tmp>
db2licm −1 Product Name = "DB2 Enterprise Server
Edition" Product Identifier = "DB2ESE" Version Information = "8.2" Expiry Date =
"Permanent" Registered Connect User Policy = "Disabled" Number Of Entitled Connect
Users = "5" Enforcement Policy = "Soft Stop" Number of processors = "1" Number of
licensed processors = "1" Database partitioning feature = "Not entitled" Annotation = " "
Other information = " " Product Name = "DB2 High Availability Disaster Recovery
Option" Product Identifier = "DB2HADR" Version Information = "8.2" Expiry Date =
"Permanent" Annotation = " " Other information = " " Product Name = "DB2 Advanced
Security Option" Product Identifier = "DB2ASO" Version Information = "8.2" Expiry

```
Date = "Permanent" Annotation = " " Other information = " "</runDASCommand>
   <runCommandPromptCommand input="dir">AHXASG.bat ASGBeta.zip RunSample.bat
xercesImpl.jar xmlParserAPIs.jar ASG.jar ASGViewer.bat sample.log xml-
apis.jar</runCommandPromptCommand>
   <grabFileContents input="sample.log">These are the contents of sample.log 1 2 3 4
5</grabFileContents>
   <diagnosticInfo input="SampleInfo1">This is the sample text to add</diagnosticInfo>
</AutomatedServiceGatherer>
```

Viewer 104 provides an interface for diagnosing target system 102. For example, viewer 102 may be employed as an administrative interface by a support center. Viewer 104 formats and displays all of the information gathered by collector application 110 and allows browsing of the diagnostic information collected at target system 102.

Viewer 104 may be implemented using a variety of devices and software. For example, viewer 104 may be implemented on a personal computer, workstation, or terminal. In addition, viewer 104 may run under a Windows operating system, or through a browser application, such as Internet Explorer by Microsoft Corporation or Netscape Navigator by Netscape Communications Corporation. In the embodiment shown, viewer 104 runs through a browser, such as Internet Explorer or Netscape Navigator that communicates with target system 102 using HTTP, secure HTTP (HTTPs), secure sockets layer (SSL), and the like. Although FIG. 1 shows a single viewer, system 100 may include any number of viewers. Alternatively, viewer 104 may run directly on target system 102.

Figure 2:
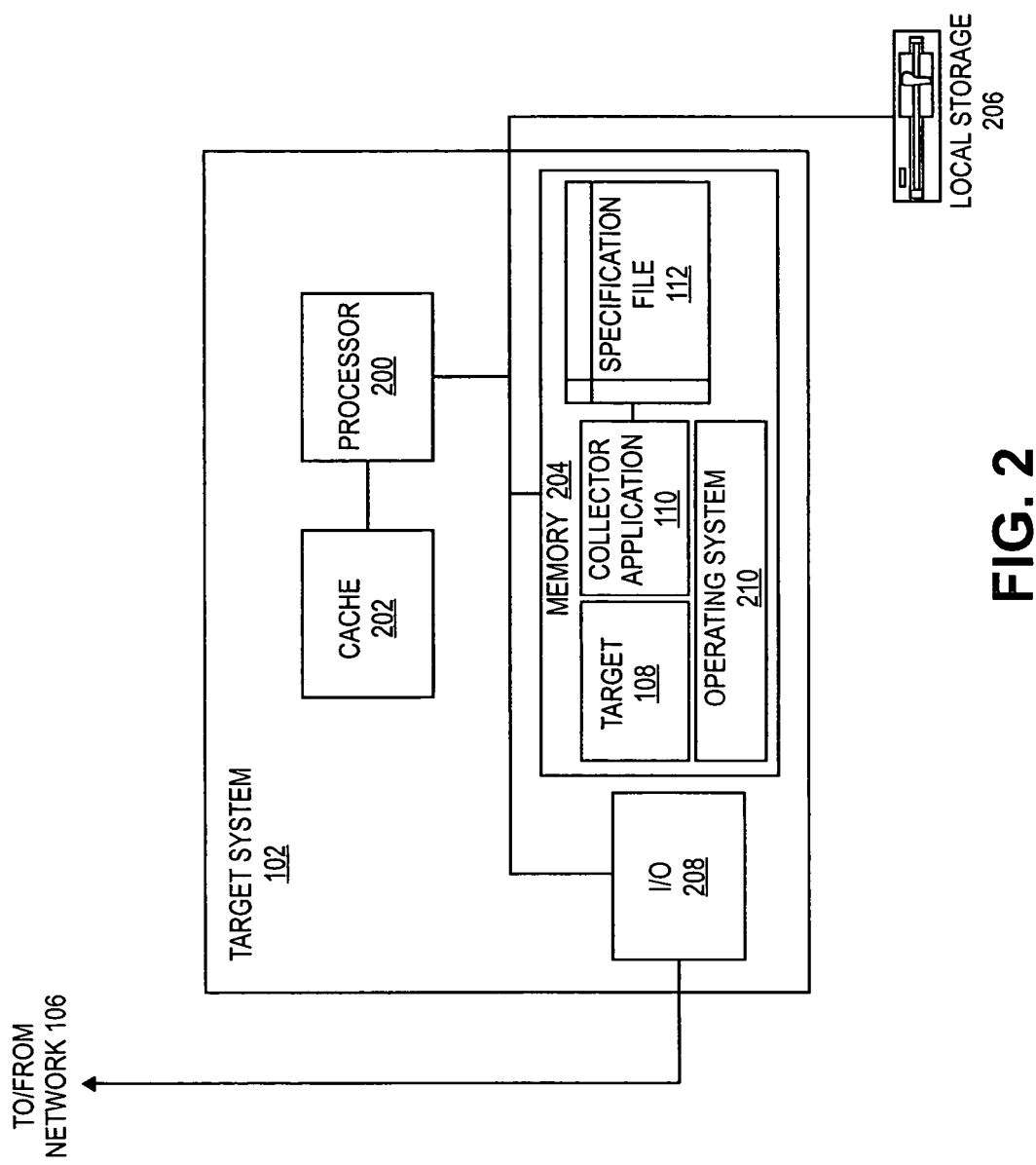
FIG. 2 shows a diagram of exemplary hardware components for the target shown in FIG. 1.

FIG. 2 shows a general hardware environment of target system 102 that is consistent with the principles of the present invention. As shown, target system 102 may include a central processor 200, a cache 202, a main memory 204, a local storage device 206, and an input/output controller 208. These components may be implemented based on hardware and software that is well known to those skilled in the art.

Processor 200 may include cache 202 for storing frequently accessed information. Cache 202 may be an "on-chip" cache or external cache. Target system 102 may also be provided with additional peripheral devices, such as a keyboard, mouse, or printer (not shown). In the embodiment shown, the various components of target system 102 communicate through a system bus or similar architecture.

Although FIG. 2 illustrates one example of the structure of a target system 102, the principles of the present invention are applicable to other types of processors and systems. That is, the present invention may be applied to any type of processor or system. For example, target system 102 may comprise multiple processors, such as those provided by the Intel Corporation, or may comprise multiple computers that are linked together.

Operating system (OS) 210 may be installed in memory 204, for example, from local storage 206, and is an integrated collection of routines that service the sequencing and processing of programs and applications by target system 102. OS 210 may provide many services for target system 102, such as resource allocation, scheduling, input/output control, and data management. OS 210 may be predominantly software, but may also comprise partial or complete hardware implementations and firmware. Well-known examples of operating systems that are consistent with the principles of the present invention include the z/OS operating system, LINUX, and UNIX.

Main memory 204 serves as the primary storage location for target system 102. For example, main memory 204 may be implemented in the form of a random access memory (RAM), a read-only memory (ROM), or combination of both. As shown, memory 204 is shown with target 108, collector application 110, and specification file 112 being loaded. Of course, one skilled in the art will recognize that these components may be swapped in/out of memory 204 based on the operations of target system 102.

Local storage 206 serves as a mass storage device for target system 102. Such devices are well known to those skilled in the art. For example, local storage 206 may be implemented as a hard disk drive, an optical drive, a tape drive, and the like.

Input/output controller 208 couples target system 102 to other devices and network 106. For example, input/output controller 208 may comprise well known hardware, firmware, and software for network communications, such as an Ethernet interface, a universal serial bus interface, and the like. Other devices and software for input/output controller 208 are well known to those skilled in the art.

Figure 3:
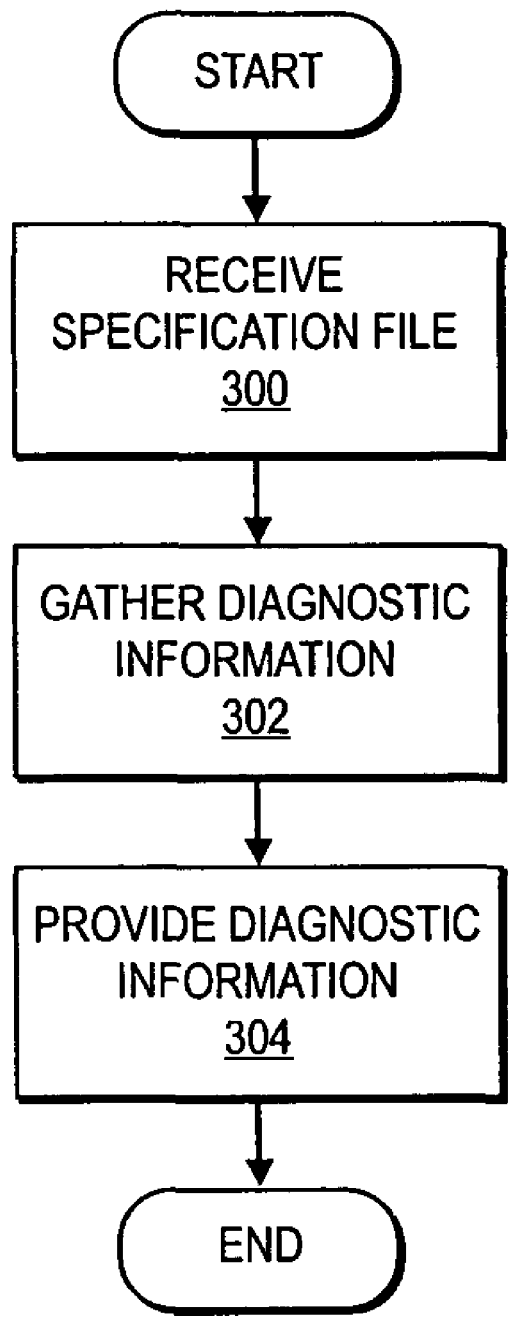
FIG. 3 shows an exemplary process flow for collecting diagnostic information from a target in accordance with the principles of the present invention.

Now that some exemplary systems have been described, the present disclosure will now describe various processes and methods that are consistent with the principles of the present invention. The flow diagram depicted herein is provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims. Reference will now be made to FIG. 3.

In general, FIG. 3 illustrates an exemplary process flow for gathering diagnostic information from target system 102 related to the running of target 108. Collecting diagnostic information can involve guiding a user through complex diagnosis on a number of related interdependent components in a stack running on target system 102. Because each diagnostic test can be an imposition, often times too little information may be collected from the user. Thus, it may be desirable minimize the amount of involvement by the user and automate some or all of this process. Embodiments of the present invention can remove or reduce the need for an iterative dialog between the user at target system 102 and a support center. In addition, embodiments of the present invention can automate the gathering, packaging, and transport of the diagnostic information. Hence, the user at target system 102 does need to have detailed knowledge about diagnostic techniques or various information gathering techniques, such as transcription.

Furthermore, a support center may have an enhanced ability to understand and evaluate any problems at target system 102 because embodiments of the present invention can provide a more complete and automated information gathering process. In some embodiments, regardless of the number of individual diagnostic tests that may be needed, collector application 110 can be customized for each target system 102 or each target 108 and configured to run automatically to perform any number of diagnostic tests based on the execution of one command or a single invocation. In particular, collector application 110 may provide a relatively generic service/platform that is a reusable and customizable framework for each supported application, such as target 108. Thus, embodiments of the present invention can also collect diagnostic information within a single or fewer sessions.

This process may be run upon request by the user when target system 102 experiences problems, such as during install or normal use. Alternatively, collector application 110 may be normally a hidden or "dormant" application. That is, collector application 110 may be normally inactive and activated on an as-needed basis by the user or a technician.

The process flow may be initiated by invoking collector application 110 from the command prompt at target system 108 via a ".bat" file (for those embodiments of collector application 110 that are Java applications). As another example, collector application 110 may be initiated using a ".sh" file for when collector application 110 is implemented on UNIX based systems. The user or technician may also be prompted to provide various necessary arguments that collector application 110 may require. These arguments may differ for different targets. Alternatively, collector application 110 may be automatically invoked in response to an event, such as a system or application failure, or based on a predetermined time interval. Processing by collector apparatus may begin at stage 300.

In stage 300, collector application 110 receives the specification file 112. For example, as noted above, the user or a technician may be prompted to enter the location of specification file 112. Collector application 110 may then receive the specification file 112 in variety of ways. In particular, the specification file 112 may be downloaded from a web site or file transfer protocol site that is accessible from network 106. Alternatively, specification file 112 may have previously been stored locally on target system 102, such as in storage 206. One skilled in the art will recognize that collector application 110 may receive specification file 112 in a variety of other ways that are consistent with the principles of the present invention, such as accessing a disk. Processing may then flow to stage 302.

In stage 302, collector application 110 customizes itself based on specification file 112 and gathers the sets of diagnostic information requested. A set of diagnostic information may be any group or amount of information resulting from a diagnostic test or other form of information gathering technique. In some embodiments, collector application 110 is implemented as a Java program, which is made customizable by providing a Java interface that can be tailored to target 108. For example, collector application 110 may: search for one or more of several versions of target 108, or run a query, such as a DB2 query, and capture output of the query, in order to obtain various sets of diagnostic information. In some embodiments, collector application 110 may employ a Java Database Connectivity (JDBC) application programming interface that enables it to execute SQL statements. This allows collector application 110 interact with any SQL-compliant database, such as a relational database management system. Collector application 110 may also support Open Database Connectivity (ODBC) methods.

Collector application 110 may also run commands when collecting the sets of diagnostic information. For example, collector application 110 may run a DB2 administrative service command on a remote DB2 instance of a database in target system 102 via TCP/IP and capture the output. Collector application 110 may also run other commands, such as DB2 commands, on a local DB2 instance of a database in target system 102. In addition, collector application 110 may run various local operating system commands, such as DOS/UNIX commands, and capture their output, or capture the contents of any system file, such as log file, trace file, text file, etc. This feature thus permits collector application 110 to make calls to an existing executable that is to collect information rather than recreating functions that may already be available for other reasons. Collector application 110 may also collect diagnostic information that a utility on target system 102 already gathers. One skilled in the art will recognize that collector application 110 may gather any type of diagnostic information. Once the diagnostic information has been collected, processing may flow to stage 304.

In stage 304, collector application 110 provides the sets of diagnostic information it has gathered into a form requested by the user or technician, as indicated in specification file 112. For example, in some embodiments, collector application 110 is configured to provide the sets of diagnostic information in the form of an XML file. Collector application 110 may then provide the XML file via email or a file transfer protocol operation. Collector application 110 may also store the diagnostic information locally on target system 102, where it can be viewed by viewer 104. A user or technician may then use viewer 104 to browse through the diagnostic information in order to diagnose target system 102.

In some embodiments, viewer 104 can be run via a command prompt script, such as "Viewer.bat" (for Java applications) or "Viewer.sh" (for UNIX applications) at target system 102 or at another computer that is remote from target system 102, such as at a workstation in a support center. The user or technician may then operate viewer 104 to browse the XML files contents, for example, in a tree-form. One skilled in the art will recognize that viewer 104 may provide a wide variety of graphical user interfaces for presenting the diagnostic information.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately. Additionally, at least one program storage device readable by machine, tangibly embodying at least one program of instructions executable by the machine, to perform the capabilities of the present invention, can be provided.

For example, collector application 110 may be provided as part of a larger product or software application. In particular, as noted previously, collector application 110 may be written as a Java application, which is instantiated in the code of another application, such as target 108. Target 108 may then call methods to capture the sets of diagnostic information desired.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of gathering diagnostic information in a customized manner for a target running on a computer, said method comprising:
   receiving a specification file that identifies sets of diagnostic information to be collected from the computer and suitable for diagnosis of problems of the target, wherein the specification file further includes manner of transportation information, which identifies one of a plurality of manner of transportation a collector application is configured to implement;

gathering the sets of diagnostic information automatically based on the specification file; and providing the diagnostic information in a format that is specified in the specification file to a viewer, wherein gathering the sets of diagnostic information comprises gathering diagnostic information about a hardware environment of the computer, wherein said sets of diagnostic information are specified in a request by the target, and wherein the collector application gathers the sets of diagnostic information, selects the one of the plurality of manner of transportation identified by the manner of transportation information for transmitting the gathered sets of diagnostic information to the viewer, and transmits the gathered sets of diagnostic information to the viewer by the selected manner of transportation.

2. The method of claim 1, wherein receiving the specification file comprises receiving the specification file from a source external to the computer.

3. The method of claim 1, wherein receiving the specification file comprises receiving the specification file from an application running on the computer.

4. The method of claim 1, wherein gathering the sets of diagnostic information comprises gathering diagnostic information about an operating system running on the computer.

5. The method of claim 1, wherein gathering the sets of diagnostic information comprises gathering diagnostic information about a middleware environment of the computer.

6. The method of claim 1, wherein gathering the sets of diagnostic information comprises executing commands specified by the target in the specification file.

7. The method of claim 6, wherein executing commands specified in the specification file comprises executing middleware commands specified in the specification file.

8. The method of claim 1, wherein providing the diagnostic information in the format that is specified in the specification file comprises providing the diagnostic information in an extensible markup language format that is specified in the specification file.

9. The method of claim 1, wherein providing the diagnostic information in the format that is specified in the specification file comprises transmitting the diagnostic information to another computer over a network.

10. The method of claim 1, wherein providing the diagnostic information in the format that is specified in the specification file comprises providing the diagnostic information to a browser application running on the computer.

11. A computer comprising means configured to perform the method of claim 1.

12. A computer readable medium having recorded thereon executable instructions for performing the method of claim 1.

13. The method of claim 1, wherein the specification file indicates services needed to diagnose the problems of the target.

14. The method of claim 1, wherein said specification file includes custom diagnostic code that augments the sets of diagnostic information including additional material specified by the target to facilitate the diagnosis of the target.

15. The method of claim 1, wherein said specification file includes a code that is subject to a condition, which if satisfied, results in an output and cumulative results comprise the sets of diagnostic information sought.

16. The method of claim 1, wherein, prior to transmitting the gathered sets of diagnostic information, the collection application packages the gathered sets of diagnostic information according to one of a plurality of packaging formats the collection application is configured to implement, and the specification file further includes packaging format information, which identifies the one of the plurality of packaging formats the collection application selects among the plurality of packaging formats for packaging the gathered sets of diagnostic information.

17. A computer configured to gather diagnostic information for a target that is running on the computer, said computer comprising:

a memory comprising a specification file that identifies sets of diagnostic information to be collected from the computer and suitable for diagnosis of problems of the target and customizes a collector application for the target, wherein the specification file further includes manner of transportation information, which identifies one of a plurality of manner of transportation the collector application is configured to implement; and a processor running the collector application that reads the specification file, automatically collects the sets of diagnostic information requested by the target, and formats the diagnostic information into an output based on the specification file, wherein the specification file identifies the sets of diagnostic information about a hardware environment of the computer and the processor automatically collects the sets of diagnostic information about the hardware environment of the computer based on the specification file, wherein said sets of diagnostic information are specified in a request by the target, and wherein the collector application collects the sets diagnostic information, selects the one of the plurality of manner of transportation identified by the manner of transportation information for transmitting the collected sets of diagnostic information to the viewer, and transmits the collected sets of diagnostic information to the viewer by the selected manner of transportation.

18. The computer of claim 17, wherein the specification file is external to the collector application.

19. The computer of claim 17, wherein the specification file requests information about a middleware environment of the computer.

20. The computer of claim 17, wherein the specification file comprises executable commands to be performed by the processor.

21. The computer of claim 17, wherein the collector application is configured to collect the diagnostic information within a single session.

22. The computer of claim 17, wherein the collector application is configured to format the diagnostic information into an extensible markup language file.

23. The computer of claim 22, wherein the collector application is configured to send the extensible markup language file to another computer.

24. The computer of claim 17, wherein, prior to transmitting the collected sets of diagnostic information, the collection application packages the collected sets of diagnostic information according to one of a plurality of packaging formats the collection application is configured to implement, and the specification file further includes packaging format information, which identifies the one of the plurality of packaging formats the collection application selects among the plurality of packaging formats for packaging the gathered sets of diagnostic information.

25. A diagnostic system that can be customized for a target running on a first computer, said system comprising:

a collector application, running on the first computer, that is customized by an external specification file specifying sets of diagnostic information to be collected from the computer and suitable for diagnosis of problems of the target, automatically collects the diagnostic information, and formats the diagnostic information into an output based on the external specification file, wherein the external specification file further includes manner of transportation information, which identifies one of a plurality of manner of transportation the collector application is configured to implement; and a viewer application configured to receive the diagnostic information output from the collector application and provide a view of the diagnostic information, wherein the sets of diagnostic information specified by the external specification file include information about a hardware environment of the first computer and the collector application automatically collects the diagnostic information about the hardware environment of the first computer based on the external specification file, wherein said sets of diagnostic information are specified in a request by the target, and wherein the collector application collects the diagnostic information, selects the one of the plurality of manner of transportation identified by the manner of transportation information for transmitting the collected diagnostic information to the viewer application, and transmits the collected diagnostic information to the viewer application by the selected manner of transportation.

26. The system of claim 25, wherein the collector application runs as a service for another application running on the first computer.

27. The system of claim 25, wherein the viewer application runs on the first computer.

28. The system of claim 25, wherein the viewer application runs on another computer remote from the first computer.

29. The system of claim 25, wherein, prior to transmitting the collected diagnostic information, the collection application packages the collected diagnostic information according to one of a plurality of packaging formats the collection application is configured to implement, and the specification file further includes packaging format information, which identifies the one of the plurality of packaging formats the collection application selects among the plurality of packaging formats for packaging the collected diagnostic information.

30. A method of collecting diagnostic information by a collector application related to a target component on a computer system, the method comprising:

receiving an invocation, the invocation being for collection of the diagnostic information from the computer system;

receiving a specification file identifying a plurality of diagnostic information and a plurality of diagnostic services required for diagnosis of problems of the target component, wherein the specification file further includes manner of transportation information, which identifies one of a plurality of manner of transportation the collector application is configured to implement;

automatically collecting the plurality of diagnostic information and performing the plurality of diagnostic services identified in the specification file corresponding to the target component to obtain collected diagnostic information for the target component in a single session; and providing the collected diagnostic information for viewing and browsing to a viewer, wherein the diagnostic information includes information related to software, middleware, or hardware of the computer system, wherein the invocation for collection of the diagnostic information is by poor performance or failure at the target component or by a user of the computer system, and wherein viewing the diagnostic data assists the viewer in diagnosing causes of the poor performance or the failure at the target component, wherein said specification file includes custom diagnostic code that augments the collected diagnostic information to include additional material specified by the target component to facilitate the diagnosis of causes of the poor performance or the failure at the target component, and wherein the collection application collects the diagnostic information, selects the one of the plurality of manner of transportation identified by the manner of transportation information for transmitting the collected diagnostic information to the viewer, and transmits the collected diagnostic information to the viewer by the selected manner of transportation.

31. The method of claim 30, wherein providing the collected diagnostic information for viewing and browsing by said viewer comprises providing the diagnostic information in a format that is specified in the specification file.

32. The method of claim 30, wherein said specification file includes a code that is subject to a condition, which if satisfied, results in an output and cumulative results comprise the diagnostic information sought.

33. The method of claim 30, wherein, prior to transmitting the collected diagnostic information, the collection application packages the collected diagnostic information according to one of a plurality of packaging formats the collection application is configured to implement, and the specification file further includes packaging format information, which identifies the one of the plurality of packaging formats the collection application selects among the plurality of packaging formats for packaging the collected diagnostic information.

34. The method of claim 33, wherein the collection application selects the one of the plurality of packaging formats from among the plurality of packaging formats for packaging the collected diagnostic information, and selects the one of the plurality of manner of transportation from among the plurality of manner of transportation for transmitting the packaged diagnostic information according to the packaging format information and the manner of transportation information provided by the specification file.

35. The method of claim 30, wherein the invocation is automatically generated by the poor performance or the failure at the target component, and, upon receiving the invocation, automatically requesting the specification file by the controller application.

36. The method of claim 35, wherein immediately upon receiving the specification file, automatically performing the plurality of diagnostic services identified in the specification file and collecting the plurality of diagnostic information, automatically packaging the collected diagnostic information, and automatically transmitting the packaged diagnostic information to the viewer.

* * * * *